United States Patent [19]
Becker

[11] 3,759,626
[45] Sept. 18, 1973

[54] BEARING ARRANGEMENT FOR MOLECULAR AND TURBO MOLECULAR PUMPS

[75] Inventor: Willi Becker, Braunfels/L, Germany

[73] Assignee: Arthur Pfeiffer Vakuumtechnik GmbH, Wetzler, Germany

[22] Filed: Oct. 22, 1971

[21] Appl. No.: 191,759

[30] Foreign Application Priority Data
Oct. 22, 1970 Germany............... P 20 52 120.4

[52] U.S. Cl. ............................... 415/90, 308/184
[51] Int. Cl. ............................................. F01d 1/36
[58] Field of Search ....................... 415/90; 308/184

[56] References Cited
UNITED STATES PATENTS

| | | | |
|---|---|---|---|
| 3,399,827 | 9/1968 | Schwartzman | 415/90 |
| 2,523,983 | 9/1950 | Arms | 308/184 R |
| 2,874,008 | 2/1959 | Orte et al. | 308/184 R |
| 3,069,016 | 12/1962 | Kisskalt et al. | 308/184 R |
| 3,494,678 | 2/1970 | Reznick et al. | 308/184 R |

*Primary Examiner*—C. J. Husar
*Attorney*—Toren and McGeady

[57] ABSTRACT

In molecular and turbo molecular pumps a bearing arrangement is provided for the member which rotates the rotor discs of the pump and includes a pair of axially spaced bearing heads each supporting a bearing for the rotating member. The bearing heads are supported from the pump casing by radially extending disc-like spring members which have a spring stiffness in the radial direction which is greater than the spring stiffness in the axial direction. Further, one of the bearing heads is biased toward the other by an axially arranged spring so that the play of the bearings is made zero. Oil is supplied to the bearings and is prevented from entering the space containing the stator and rotor discs. Damping elements are provided in association with the radially extending spring members or, alternatively, damping material is coated on the spring members.

11 Claims, 4 Drawing Figures

INVENTOR
Willi Becker by
Toren & McGeady
ATTORNEYS

BEARING ARRANGEMENT FOR MOLECULAR AND TURBO MOLECULAR PUMPS

SUMMARY OF THE INVENTION

The present invention is directed to a bearing arrangement for molecular and turbo molecular pumps and, more particularly, it is directed to the resilient support of bearings for the member which rotates and rotor members in the pump.

Molecular pumps and turbo molecular pumps rotate at high speeds and are high vacuum pumps which require backing pumps for their operation. The pumps develop their full effect in the molecular flow range only, operating at pressures below $10^{-2}$ to $10^{-3}$ Torr. in dependence on the size of the pumps. Mostly, however, such pumps are used at much lower pressures. However, the lower pressures cause some difficulties in pump operation.

The effectiveness of the molecular and turbo molecular pumps depends to a great degree on the speeds at which they rotate. The pumping speed or suction capacity of these pumps increases linearly with the rotational speed, while the pressure ratio increases exponentially with the rotational speed. Accordingly, it is desirable to operate such pumps at the highest possible rotational speed. However, the rotational speed is limited by the strength of the material used for the pump. With modern high strength materials the permissible rotational speed is limited by the natural frequency of the rotor. At the low operating pressures indicated above, no damping exists due to the ambient medium, accordingly, very sharp resonances may develop. An additional disadvantage which has been experienced is that the pumps have a long running-down time when a current failure occurs, because of the lack of friction, such running-down time can last several hours. As a result, molecular and turbo molecular pumps cannot be operated in the super-critical range when ordinary bearings are used, since the period of operation at critical rotational speeds would be too long. Moreover, in molecular and turbo molecular pumps the spacing between the stator and the rotor is very small, in molecular pumps it may be smaller than 0.1 mm, while in turbo molecular pumps the spacing may be on the order of 1 mm or more. If there is any contact between the rotor and the stator while the pump is operating at critical rotational speed, it would lead to instantaneous destruction of the pump. Accordingly, all known molecular and turbo molecular pumps have run in the subcritical range of rotational speeds. Another difficulty faced by such pumps is that the play of the bearings in the radial direction must be decreased as the rotational speed is increased so that stable operating conditions can be assured. Moreover, at least one of the bearings must be yieldable in the axial direction to afford compensating changes in the length of the rotor shaft due to the heat developed during operation.

Accordingly, it is a primary object of the present invention to show a way to run molecular and turbo molecular pumps in the super-critical range of rotational speeds without incurring the problems experienced in the past when such high rotational speeds were developed. The former problems are avoided by arranging the bearings so that they run without any play between them and with at least one of the bearings being resiliently biased toward the other in the axial direction.

Therefore, in accordance with the present invention, a bearing arrangement is provided for molecular and turbo molecular pumps by supporting each of the bearings within a bearing head and supporting the bearing heads in the radial direction by means of springs, and by resiliently biasing at least one of the bearing heads toward the other in the axial direction. The spring stiffness or characteristic of the spring acting in the radial direction is selected so that the deflection by the proper weight of the rotor is small as compared to the play between the rotor and stator. The bearing head is biased in the axial direction by a spring so that the play of the bearings is made to be zero. Further, damping elements are associated with the springs extending in the radial direction and are formed of a material with a high internal damping characteristic, such as Perbunan, Vulkollan, or a metal with a high damping characteristic can be used, such as indium or lead. This bearing arrangement can be used in pumps having a horizontal axis as well as in ones with a vertical axis.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE DRAWING

Figure 1:
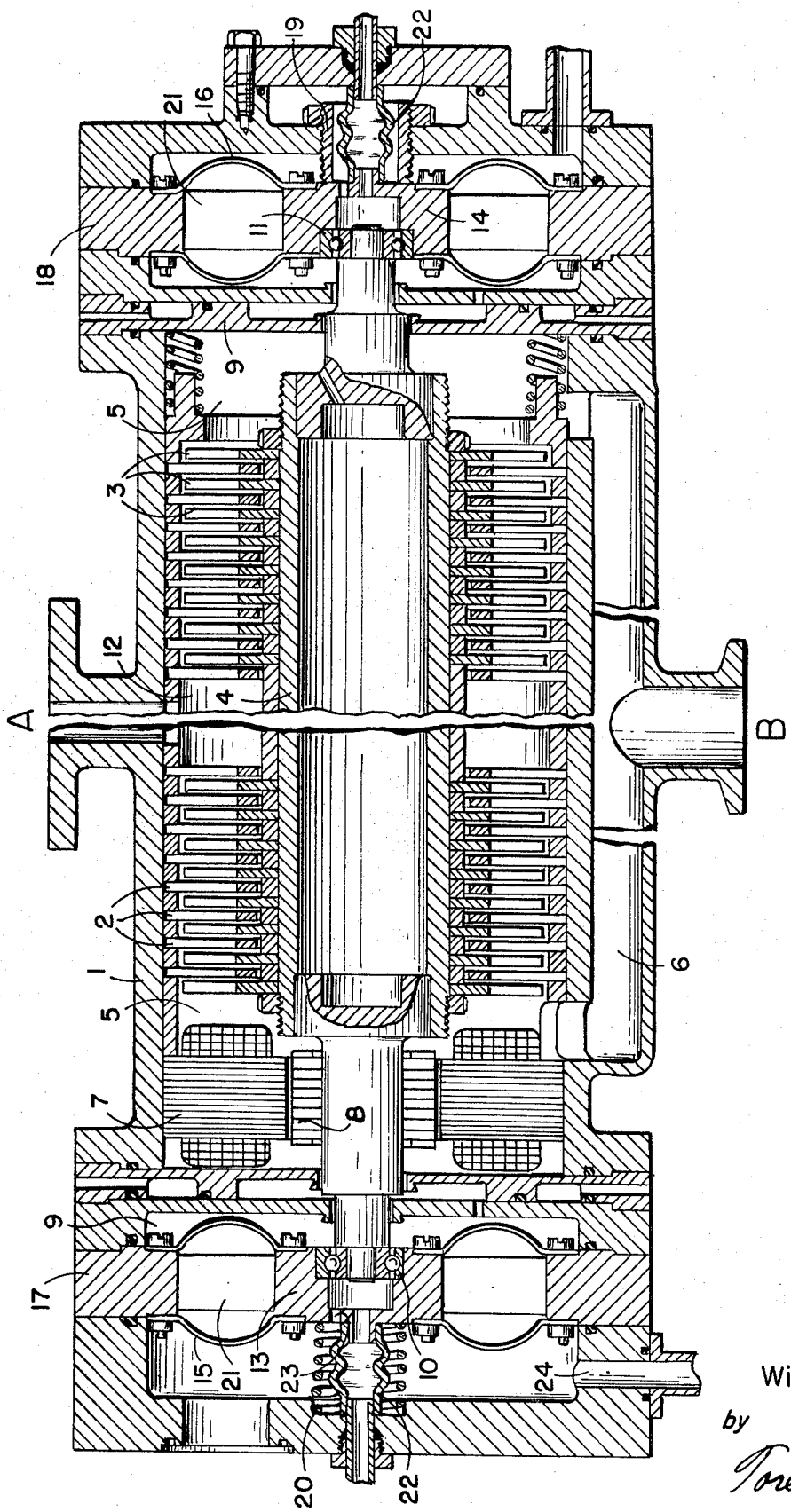
FIG. 1 is an axially extending sectional view of a turbo molecular pump embodying the present invention and having a horizontally arranged axis.

In FIG. 1 a turbo molecular pump is shown with its axis extending horizontally. The pump is enclosed by a casing 1 within which a plurality of stator wheels or discs 2 are arranged. Positioned between and spaced from the stator wheels are rotor discs or wheels 3 of a rotor 4. The gas to be pumped enters the pump at an inlet A and is divided into two streams which are fed by the alternately arranged stator and rotor discs into the backing spaces 5 at the opposite ends of the rotor 4. From the backing spaces 5, the gas flows into a backing pipe 6 and then is withdrawn by a backing pump, not shown, through an outlet B.

At the left hand end of the rotor 4 in FIG. 1, a motor is positioned for driving the pump and consists of a stator 7 and a squirrel cage rotor 8. At each end of the rotor 4 a oil vapor baffle 9 extends radially between the rotor and the casing. Such oil vapor baffles are usually water cooled. The oil vapor baffles 9 prevent oil vapor used in the bearing arrangement from entering into the pump space 12 containing the stator and rotor discs.

The bearing arrangement comprises a pair of bearings 10, 11 each located on one end of the rotor and each mounted in a bearing head 13, 14, respectively. Each bearing head is connected by a pair of springs 15, 16 to a casing ring 17, 18 spaced radially outwardly from the bearing head. The springs 15, 16 are chosen so that the spring stiffness or characteristic is sufficient, based on the proper weight of the rotor, so that any deflection is small. Depending on the play between the components of the rotor within the casing, the amount of deflection amounts to only a fraction of the play. However, the spring stiffness should be as low as possible so that the operational rotational speed of the pump is above its natural frequency. As the operational rotational speed of the pump is increased, it becomes easier to fulfill the above conditions. The springs 15, 16 can be formed as plate springs, as diaphragms, or as split discs and the like. The stiffness or characteristic of the springs in the axial direction should be substantially lower than the stiffness or characteristic in the radial direction. In the axial direction it is necessary for the springs to be more yieldable or resilient so that upon expansion of the rotor due to heating the bearings can follow such movement without any appreciable loading on the bearings in the axial direction.

To assure that the play between the bearings is maintained as near as possible to zero, one of the bearings 11 is mounted against an adjustable abutment 19 and the other bearing 10 is biased by an axially arranged spring 20 toward the first bearing. Accordingly, both of the bearings 10, 11 are subjected to the biasing action of the spring 20 and the play between them is maintained at a zero level. The biasing action of the spring is selected substantially equal to the weight of the rotor to safeguard running without play.

To maintain the amplitude low in the event of resonance within the vacuum, the possible oscillation must be strongly damped. Damping elements 21 extend radially outwardly from the bearing heads to the casing rings and are located between the pairs of springs 15, 16. For the damping elements 21, a material of high internal damping must be used, resilient synthetic substances such as Perbunan, Vulkollan or Viton are suitable. If the damping elements are not connected to the bearing heads 13, 14 and to the casing rings, 17, 18 by vulcanizing, they may be subject to a biasing action which is sufficiently high so that at the highest amplitude the bearing head cannot lift itself off the damping element. Alternatively, instead of synthetic damping materials for the damping elements, metals can be used, such as lead and indium which have suitable damping characteristics. Moreover, in place of the damping elements, a layer of metallic damping material, such as indium or lead, can be coated on the springs to a thickness corresponding substantially to the thickness of the springs. In such an arrangement, the springs fix the position of the bearing heads while the coating of the damping material provides the necessary damping action. Thermal conduction through the springs from the bearings to the casing is extremely small. Since these pumps operate under a vacuum and heat can only be discharged by radiation, excessively high temperatures would arise in the bearings. In order to remove the head of friction the bearings have to be cooled by a cooling medium. The simplest method of heat removal is to supply lubricating oil to the bearings. To supply the required amount of oil to the bearings, the bearing heads are connected to the casing by means of a section of resilient hose 22. The hose may be corrugated, as shown, or it may be of a smooth construction. By choosing a hose formed of a material having a high damping characteristic, an additional damping action can be provided against the vibration of the bearing head. The damping material for the hose can be either a synthetic material or metal. Since it is difficult to force the amounts of oil required for cooling through a bearing running at high rotational speed, an overflow 23 is provided at the bearing head so that excess oil is removed while the bearing continuously receives the amount of oil necessary for faultless running. After the oil passes through the overflow 23, it is removed from the casing through a drain 24 and is recycled to the bearings by an oil pump, not shown.

Figure 2:
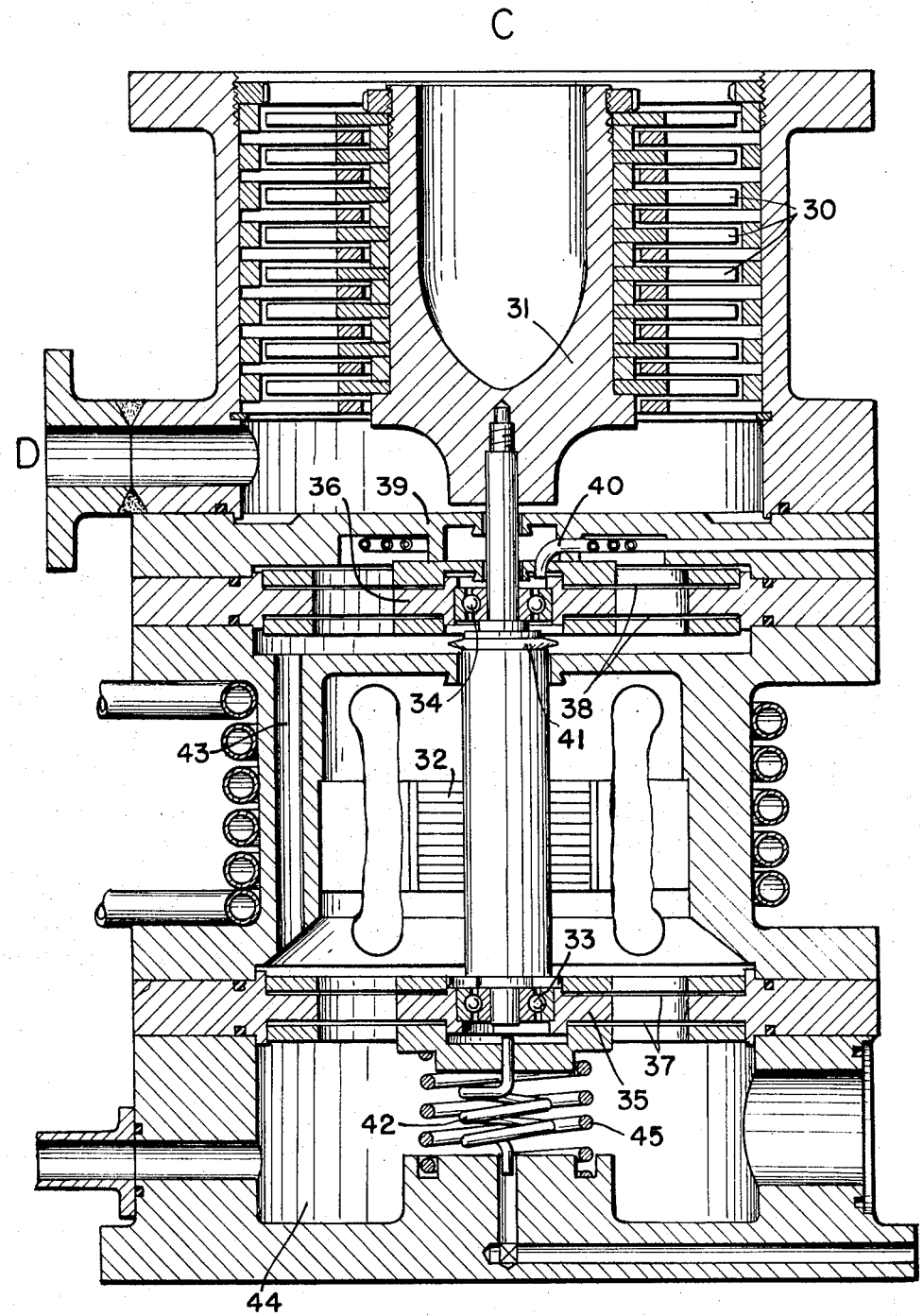
FIG. 2 is an axially extending sectional view of a turbo molecular pump embodying the present invention and having a vertically extending axis.

In FIG. 2, a turbo molecular pump is shown with a vertically arranged axis with gas entering the pump through the inlet C, being compressed by the stator and rotor wheels or discs as it passes downwardly and eventually being withdrawn through the outlet D by a backing pump, not shown. In this arrangement the rotor consists of the wheels or discs 30 and a hollow shaft 31 which is journalled cantilever-fashion onto a rotor 32 of a driving motor. The rotor or rotating member 32 which drives the pump rotor is supported adjacent its upper end within a bearing 34 mounted in a bearing head 36 and the lower end of the rotor is supported within a bearing 33 mounted within a bearing head 35. Each of the bearing heads is fixed to a pair of flat disc-shaped springs, 37, 38 which extend radially outwardly to and are fixed to the casing. These disc-shaped springs 37, 38 have a suitably high spring stiffness or characteristic in the radial direction and a suitably lesser spring stiffness or characteristic in the axial direction. The upper bearing head 36 is supported against an abutment 39 and the lower bearing head 35 is biased in the upward direction by a spring 45. In this embodiment, the spring 45 must exceed the strength of the spring 20 as shown in the embodiment in FIG. 1, by the weight of the entire rotor, so that the upper bearing can be pressed against the abutment with the axial force necessary for operating without any play between the bearings. A movable line 40 supplies the oil required for lubricating and cooling the upper bearing with any excess oil flowing through the bearing being thrown outwardly by a splasher ring 41 to a pipe 43 through which it drains downwardly within the casing. Preferably, the line 40 is made of a material having a high internal damping characteristic. Another line 42 is provided at the lower end of the casing for supplying lubricating and cooling oil into the lower bearing 33. Similarly, the line 42 can also be formed of a material with a high damping characteristic. The oil flowing through the upper and lower bearings accumulates in the space 44 and then flows to an oil pump, not shown.

Figure 3:
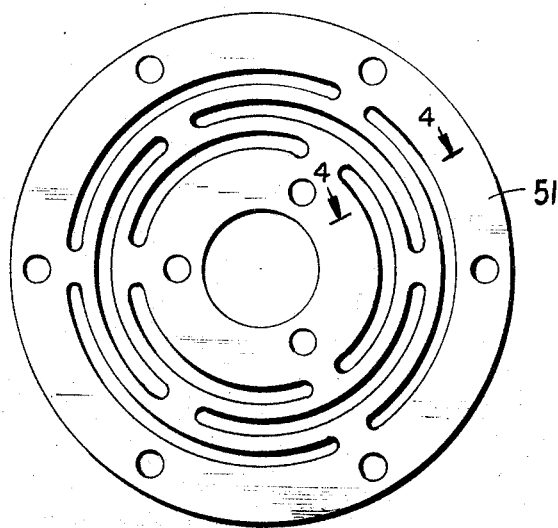
FIG. 3 is a plan view of a spring member in accordance with the present invention.
Figure 4:
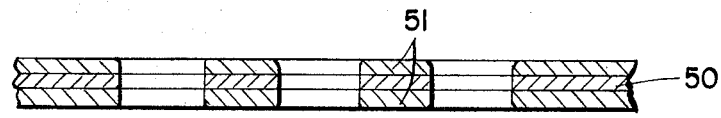
FIG. 4 is a partial section taken along the line 4—4 in FIG. 3.

In the embodiment of the invention shown in FIG. 2, the springs 37 and 38 are formed as split disc springs, as illustrated in FIG. 3. A partial section of the spring shown in FIG. 3 is provided in FIG. 4. The inner load-carrying spring portion 50 is formed of a high strength material, for example steel or a hard-rolled brass, with a coating on both of its opposite surfaces of indium or another well-known damping material 51. A spring constructed in such a manner has the required stiffness in the radial direction and the necessary resiliency in the axial direction so that unduly high forces are not transmitted to the bearings.

What is claimed is:

1. In molecular and turbo molecular pumps comprising a casing, a plurality of alternating spaced rotor discs and stator discs disposed in said casing, means for rotating said rotor discs including an axially elongated rotating member, and a bearing assembly for rotatably supporting said rotating member, wherein the improvement comprises that said bearing assembly includes a pair of axially spaced bearing heads spaced inwardly from said casing, a bearing supported within each of said bearing heads and arranged for rotatably supporting said rotating member, first spring means secured to and extending radially outwardly from said bearing head, second spring means biasing at least one of said bearing heads in the axial direction toward the other said bearing head, said first spring means has a greater spring stiffness in the radial direction as compared to its spring stiffness in the axial direction, said first spring means for each said bearing head comprises a pair of axially spaced radially extending spring members each secured along its radially inner edge to said bearing head, a casing ring laterally enclosing and disposed radially outwardly from each said bearing head, and the radially outer edges of said spring members being secured to said casing ring.

2. In molecular and turbo molecular pumps, as set forth in claim 1, wherein said spring members are flat disc-shaped plate springs.

3. In molecular and turbo molecular pumps, as set forth in claim 1, wherein said spring members are plate springs having a curved surface in a radially extending plane through the axis of said rotating member with the curved surface extending outwardly from the transversely extending surface of said bearing head.

4. In molecular and turbo molecular pumps, as set forth in claim 1, wherein damping means are associated with said first spring means.

5. In molecular and turbo molecular pumps, as set forth in claim 4, wherein said damping means comprises a damping element located between said spring members and extending radially between said bearing head and said casing ring.

6. In molecular and turbo molecular pumps, as set forth in claim 4, wherein said damping means comprises a coating of damping material deposited on the surfaces of said spring members.

7. In molecular and turbo molecular pumps, as set forth in claim 6, wherein said damping material is a metal selected from the group consisting of lead and indium.

8. In molecular and turbo molecular pumps, as set forth in claim 6, wherein said damping material is a resilient synthetic damping material.

9. In molecular and turbo molecular pumps, as set forth in claim 1, wherein the axis of said rotating member is arranged horizontally and each of said bearing heads is located spaced outwardly from an opposite end of said stator and rotor discs, said spring members are plate members extending between said bearing head and said casing ring, said second spring means comprises an axially extending helical spring bearing against one of said bearing heads on the side thereof opposite said bearing supported therein, and an adjustable abutment supporting the other one of said bearing heads.

10. In molecular and turbo molecular pumps, as set forth in claim 9, including means for supplying lubricating oil to and removing it from said bearings, and vapor baffles positioned between said bearings and said stator and rotor discs and extending across said casing for preventing oil vapor from penetrating into the space containing said stator and rotor discs.

11. In molecular and turbo molecular pumps, as set forth in claim 1, wherein the axis of said rotating member is arranged vertically, and extends from one end of said stator and rotor discs, said spring members are flat disc-shaped springs, said second spring means comprises an axially extending helical spring bearing against the one of said bearing heads more remote from said stator and rotor discs and biasing said rotating member toward said stator and rotor discs, and an abutment for supporting the other said bearing head.

* * * * *

UNITED STATES PATENT OFFICE
CERTIFICATE OF CORRECTION

Patent No. 3,759,626          Dated September 18, 1973

Inventor(s) WILLI BECKER

It is certified that error appears in the above-identified patent and said Letters Patent are hereby corrected as shown below:

In the heading of the patent:

The date of the foreign priority application should read --October 23, 1970--.

The address of the assignee should read --Wetzlar, Germany--.

Signed and sealed this 1st day of January 1974.

(SEAL)
Attest:

EDWARD M. FLETCHER, JR.
Attesting Officer

RENE D. TEGTMEYER
Acting Commissioner of Patents